(12) United States Patent
Markey et al.

(10) Patent No.: US 8,732,806 B2
(45) Date of Patent: May 20, 2014

(54) METHOD AND SYSTEM FOR HARDWARE ENFORCED VIRTUALIZATION IN AN INTEGRATED CIRCUIT

(75) Inventors: John Markey, San Diego, CA (US); Love Kothari, Sunnyvale, CA (US); Paul Chou, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 865 days.

(21) Appl. No.: 12/559,154

(22) Filed: Sep. 14, 2009

(65) Prior Publication Data

US 2011/0067110 A1    Mar. 17, 2011

(51) Int. Cl.
*G06F 21/00*    (2013.01)
(52) U.S. Cl.
USPC ............................... 726/6; 713/189; 713/190
(58) Field of Classification Search
USPC ............................................ 726/26; 713/189
See application file for complete search history.

(56) References Cited

U.S. PATENT DOCUMENTS

| | | | |
|---|---|---|---|
| 7,444,682 | B2 | 10/2008 | Li et al. |
| 2005/0132217 | A1* | 6/2005 | Srinivasan et al. ............ 713/200 |
| 2006/0090084 | A1* | 4/2006 | Buer ............................ 713/189 |
| 2007/0157000 | A1 | 7/2007 | Qawami et al. |
| 2007/0294497 | A1 | 12/2007 | Chen |
| 2009/0204823 | A1* | 8/2009 | Giordano et al. ............. 713/190 |

\* cited by examiner

*Primary Examiner* — Taghi Arani
*Assistant Examiner* — Ali Shayanfar
(74) *Attorney, Agent, or Firm* — Brinks Gilson & Lione (57) ABSTRACT

Aspects of a method and system for hardware enforced virtualization in an integrated circuit are provided. In this regard, a mode of operation of an integrated circuit may be controlled such that the integrated circuit alternates between a secure mode of operation and an open mode of operation. Various resources of the integrated circuit may be designated as open or secure, and secure resources may be made inaccessible while the integrated circuit operates in the open mode. Access to the secure resources may be controlled based on a configuration of one or more registers and/or switching elements. Resources designated as secure may comprise, for example, a one-time-programmable memory. The integrated circuit may comprise ROM and/or one-time-programmable memory that stores one or more instructions, wherein execution of the one or more instructions may control transitions between the secure mode and the open mode.

19 Claims, 4 Drawing Sheets

METHOD AND SYSTEM FOR HARDWARE ENFORCED VIRTUALIZATION IN AN INTEGRATED CIRCUIT

CROSS-REFERENCE TO RELATED APPLICATIONS/INCORPORATION BY REFERENCE

This patent application makes reference to:
U.S. Provisional patent application Ser. No. 12/559,221 filed on Sep. 14, 2009; and
U.S. Provisional patent application Ser. No. 12/559,242 filed on Sep. 14, 2009.

The above stated application is hereby incorporated herein by reference in its entirety.

FIELD OF THE INVENTION

Certain embodiments of the invention relate to a method and system for computing. More specifically, certain embodiments of the invention relate to a method and system for hardware enforced virtualization in an integrated circuit.

BACKGROUND OF THE INVENTION

Integrated circuits or chips are electronic components that exploit the electronic properties of semiconductor materials, principally silicon, germanium and gallium arsenide. Integrated circuits or chips are manufactured both as single discrete devices and as integrated circuits (ICs), which consist of a number of devices manufactured and interconnected on a single semiconductor substrate.

Integrated circuits or chips, for example, the integrated circuits in mobile handsets may have a boot read-only memory (ROM) with boot code integrated into their silicon so such a device or chip could perform quite sophisticated boot sequence on its own and load boot programs from various sources like NAND flash, SD or MMC card and so on. Also a boot ROM is often able to load boot loader or diagnostic program via serial interfaces like UART, SPI, USB and so on.

Integrated circuits or chips may be equipped with an one-time programmable (OTP) memory. The OTP memory is a field-programmable logic array (FPLA) that it may not be updated and reused after its initial programming. In other words, the OTP memory may be programmed once and may not be subsequently reprogrammed. The data stored in the OTP memory may be used for various customer specific applications such as, for example, enabling configuring chip usage features, authenticating any secondary boot images (for example, NOR, NAND, USB flashes), authenticating any other codes running on the device or chip, etc.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for hardware enforced virtualization in an integrated circuit, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for hardware enforced virtualization in an integrated circuit. In various embodiments of the invention, a mode of operation of an integrated circuit may be controlled such that, at any given instant in time, the integrated circuit operates in either a secure mode of operation or an open mode of operation. Various resources of the integrated circuit may be designated as open or secure, where secure resources may be made inaccessible while the integrated circuit operates in the open mode. Access to the secure resources may be controlled based on a configuration of one or more registers and/or switching elements in the integrated circuit. Resources designated as secure may comprise, for example, a one-time-programmable memory. A memory may be partitioned and a portion may be designated as secure while another portion may be designated as open.

The integrated circuit may comprise ROM and/or one-time-programmable memory that stores one or more instructions, wherein execution of the one or more instructions may control transitions between the secure mode and the open mode. The instructions may ensure that one or more buffers are flushed and/or emptied prior to transitioning between modes. The instructions may ensure that one or more caches are flushed and/or emptied prior to transitioning between modes. The instructions may ensure that reads and/or writes to memory have completed or are cancelled prior to transitioning between modes. The integrated circuit may comprise a hardware-defined state machine that controls transitions between modes. The integrated circuit may comprise one or more counters, and transitions between modes may be triggered based on a state of the one or more counters. The integrated circuit may reset in instances that it has not operated in the secure mode for longer than a determined period of time.

Figure 1:
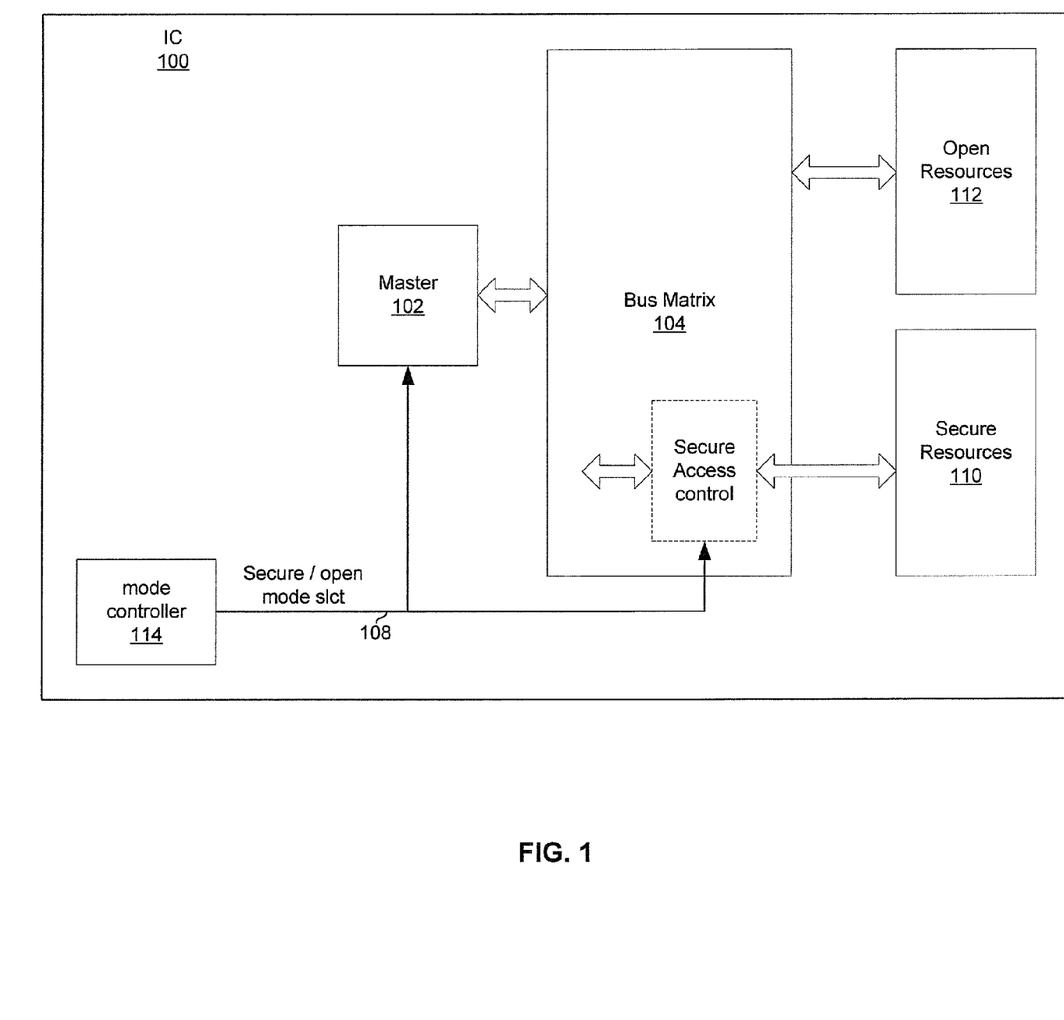
FIG. 1 is a diagram illustrating hardware enforced virtualization in a integrated circuit, in accordance with an embodiment of the invention.

FIG. 1 is a diagram illustrating hardware enforced virtualization in a integrated circuit, in accordance with an embodiment of the invention. Referring to FIG. 1, there are shown components of an integrated circuit (IC) 100 comprising a master 102, a bus matrix 104, secure resources 110, open resources 112, and a mode controller 114.

The master 102 may comprise, for example, a controller or a processor operable to control operations of the integrated circuit 100. For example, the master 102 may be an ARM processor and/or a direct memory access (DMA) controller. In an exemplary embodiment of the invention, the master 102 may execute code and/or implement algorithms, interacting with and/or transferring information between various resources or modules of the IC 100 to implement operations of a wireless handset. For example, the master 102 may interact with and/or control various other modules of the IC 200 to process audio, video, and/or data that was received or is to-be-transmitted via one or more wireless communication protocols.

The secure resources 110 may comprise logic, circuitry, interfaces, and/or code that may implement various functions within the integrated circuit 100. The secure resources 110 may be protected such that they may only be accessed by the master 102 while the IC 100 and/or the master 102 is operating in a secure mode. The secure resources 110 may comprise, for example, random access memory (RAM), read only memory (ROM), non-volatile RAM (NVRAM), flash memory, one-time-programmable (OTP) memory, a memory controller, a memory scrambling module, an interrupt controller, a random number generator (RNG), a watchdog timer, an oscillator or clock, a cryptographic accelerator, and/or a public key accelerator (PKA).

The open resources 112 may comprise logic, circuitry, interfaces, and/or code that may implement various functions within the integrated circuit 100. The open resources 110 may be accessed by the master 102 while the IC 100 and/or the master 102 is not operating in a secure mode. The open resources 112 may comprise, for example, a memory, a memory controller, a cryptographic accelerator, and/or an interrupt controller.

The bus matrix 104 may comprise suitable logic, circuitry, interfaces and/or code that may be operable to provide communication connections for transferring data among modules in the integrated circuit 100. The bus matrix 104 may be operable to provide communication connections to, from, and/or between the master 102, the secure resources 110, and the open resources 112. The bus matrix 102 may be operable to ensure that the secure resources 110 may be accessed only by the master 102 while the IC 100 and/or the master 102 is operating in a secure mode. In this manner, the bus matrix 104 may enable hardware enforced access control to the secure resources 110.

The mode controller 114 may comprise suitable logic, circuitry, interfaces, and/or code that may be operable to control a mode of operation of the IC 100 and/or the master 102. In various embodiments of the invention, the mode controller 114 may store information, such as vector tables, that is associated with an open mode of operation, separately from information, such as vector tables, that is associated with a secure mode of operation. In some embodiments of the invention, the mode controller 114 may ensure that information associated with secure mode of operation is not available during an open mode of operation. In some embodiments of the invention, the mode controller 114 may implement transitions between an open mode of operation and a secure mode of operation via a secure application programming interface (API). In this regard, as part of the transition to the open mode of operation, secure information and/or states in the master 102 and/or the secure resources 110 may be made unavailable such that they may not be accessed during open mode of operation. In an exemplary embodiment of the invention, the mode controller 114 may provide an indication 108 of the mode of operation of the IC 100.

In various embodiments of the invention, operation of the mode controller 114 may be controlled based on a hardware-defined state machine. In this regard, states, inputs, and/or transitions between states of the state machine may be tracked and/or controlled via dedicated logic and/or storage elements.

In various embodiments of the invention, operation of the mode controller 114 may be controlled based on instructions or an operating system stored in a secure ROM and/or OTP memory. In this manner, operation of the mode controller 114 may be independent of software programmed and/or modified in the IC 100 after manufacturing.

In operation, the IC 100 and/or master 102 may operate in a secure mode of operation during some portion of time and may operate in an open mode of operation during a remaining portion of time. In this manner, two logical environments may be realized in a single IC. While operating in an open mode of operation, various secure resources may be unavailable and access may be restricted via hardware. For example, security keys may be stored in OTP memory and the OTP memory may be inaccessible, based on hardware configuration, while the IC 100 is operating in an open mode. In this regard, access may be prevented via one or more registers, switching elements, and/or other hardware components. In an exemplary embodiment of the invention, the IC 100 may be operable to process signals and/or implement functions to effect operation of a wireless handset. For example, the IC 100 may process audio, video, and/or data received and/or to be transmitted utilizing one or more communication protocols.

Prior to transitioning from a secure mode of operation to an open mode of operation, and visa-versa, it may be ensured that various modules and/or resources of the IC 100 are in a known and/or predetermined state. Accordingly, the master 102 may be required to execute a sequence of instructions in order to transition between modes. The instructions may be fixed and/or known. The instructions may be stored in ROM or OTP memory such that they are not modifiable. In addition to requiring the master 102 to execute the sequence of instructions, it may also be ensured that all of the instructions have completed execution prior to the transition between modes. Executing the sequence of instructions may ensure, for example, that one or more buffers or queues are empty, one or more caches are empty, and/or that pending reads or writes to memory have completed or are cancelled In various embodiments of the invention, a boot sequence may be stored in a boot ROM and may not be modifiable. Accordingly, similar to transitioning between states, the boot sequence may ensure that one or more instructions are executed such that various components and/or modules of the IC 100 are in a known and/or predetermined state and can be trusted. The boot sequence may be controlled and/or performed by hardware. During the boot sequence, various modules and/or resources of the IC 100 may be designated as secure or open. Accordingly, prior to manufacture of the IC 100 a boot sequence resulting in the desired configuration of may be programmed into boot ROM.

In various exemplary embodiments of the invention, during an open mode of operation, the master 102, the bus matrix 104, and/or the secure resources 110 may be configured such that signals and/or data may not be sent to and/or received from the secure resources 110. In this regard, the master 102, the bus matrix 104, and/or the secure resources 110 may be configured via, for example, one or more switching elements and/or registers, where a register may comprise one or more latches and/or one or more flip-flops. The configuration of the master 102, the bus matrix 104, and/or the secure resources 110 may be based on, for example, signals generated by the mode controller 114.

Figure 2:
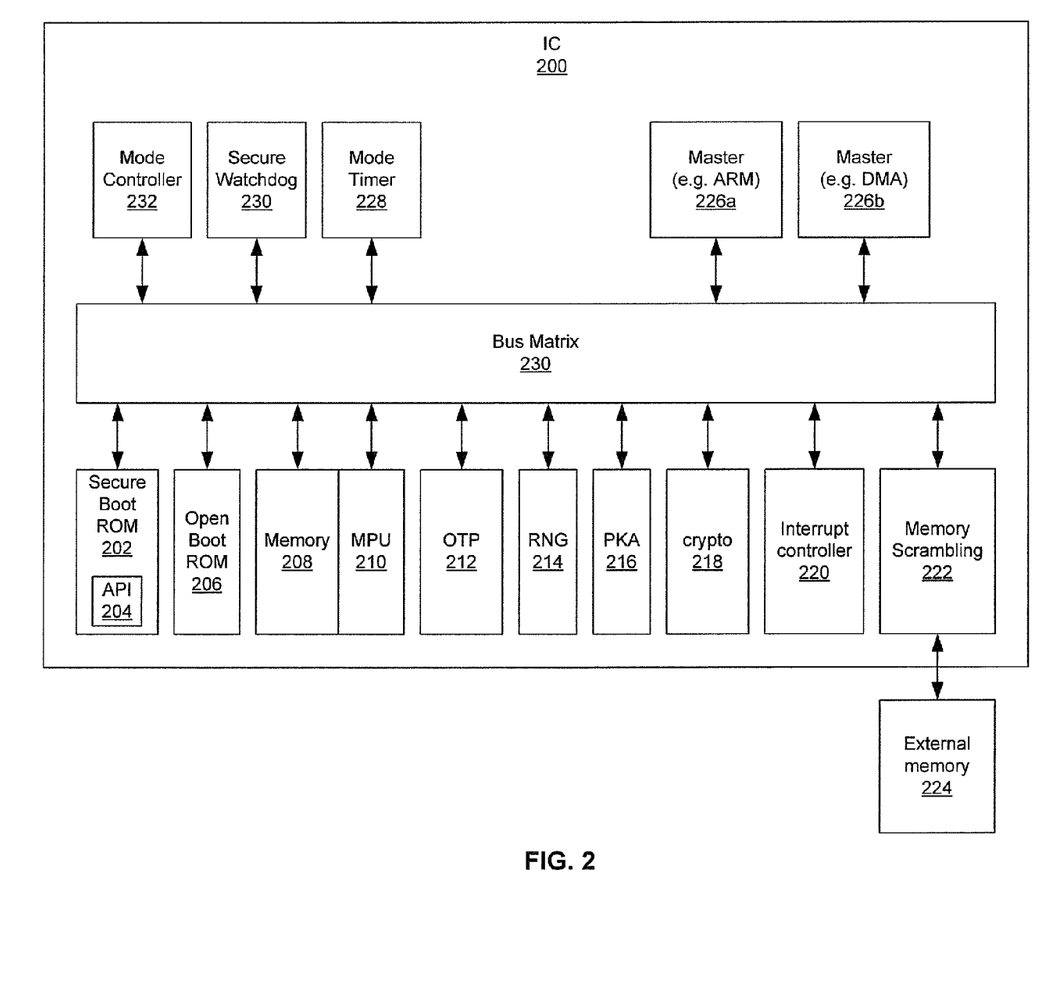
FIG. 2 is a diagram illustrating an exemplary integrated circuit operable to implement hardware enforced virtualization, in accordance with an embodiment of the invention.

FIG. 2 is a diagram illustrating an exemplary integrated circuit operable to implement hardware enforced virtualization, in accordance with an embodiment of the invention. Referring to FIG. 2, there is shown an IC 200 comprising a secure boot ROM (BROM) 202 comprising an API 204, an open BROM 206, a memory 208 with corresponding memory partitioning unit (MPU) 210, an OTP memory 212, a random number generator (RNG) 214, public key accelerator (PKA) 216, cryptographic accelerator 218, interrupt controller 220, memory scrambling unit 222, external memory 224, masters 226a and 226b, mode timer 228, secure watchdog module 230, and mode controller 232.

The secure boot ROM (BROM) 202 may comprise boot code and/or customer data. The boot code may comprise booting instructions and/or other algorithms to be executed during power up or reboot. The boot code may be developed in a secure environment with restricted access. The boot code is unmodifiable once programmed into the secure BROM 202. The customer data may comprise, for example, a public key for authentication and/or a symmetric key for decryption. The boot code and/or the customer data may control which modules and/or resources of the IC 200 are secure and which modules and/or resources of the IC 200 are open. In various embodiments of the invention, the secure BROM 202 may comprise an API 204 which may be utilized by the IC 200 to transition between the secure mode and the open mode of operation. In this regard, the API 204 may define one or more functions and/or instructions that must be performed, and/or protocols that must be followed, to effect a transition from the open mode to the secure mode, or from the secure mode to the open mode.

The open BROM 206 may be similar to the secure BROM 202 but may be accessible during open mode of operation. For example, boot-up may begin executing from the secure boot ROM 202 and once the secure boot-up completes and it has been determined that the IC 200 is in a known trusted state, then boot-up may continue from the open BROM 206.

The memory 208 may comprise, for example, RAM, ROM, NVRAM, or flash memory. The memory partitioning unit (MPU) 210 may comprise suitable logic, circuitry, interfaces, and/or code that may be operable to partition the memory 208 into a secure portion and an open portion and to ensure that the data doesn't leak between the two portions. The location and/or size of the portions may be determined during boot-up and/or may be configured while the IC is operating in a secure mode.

The OTP memory 212 may comprise suitable logic, circuitry, interfaces and/or code that may be operable to store data. The data stored in the OTP memory 212 may be programmed once and may not be subsequently reprogrammed. The data stored in the OTP memory 212 may comprise security keys. The OTP memory may comprise, for example, keys that may be used by the boot code in the secure BROM 202 to authenticate any secondary boot images. The data stored in the OTP memory 212 may comprise, for example, customer specific secrets or keys that may be used to authenticate any other codes which may run on the integrated circuit 200. If the authentication fails, the integrated circuit 200 may reset itself. Data stored in the OTP memory 212 may be accessible while the IC 200 is in a secure mode of operation and inaccessible while the IC 200 is in an open mode of operation. For example, data in the OTP memory 212 read during a secure boot-up may be hidden afterwards from any further reads until the IC 200 is rebooted. In one embodiment of the invention, initial units of the IC 200 manufactured for a customer or order may enable JTAG access to the OTP and in later parts the JTAG access to OTP may be disabled.

The random number generator (RNG) 214 may comprise suitable logic, circuitry, interfaces and/or code that may be operable to generate a sequence of numbers or symbols that lack any pattern, i.e., appear random. The RNG 214 may generate the random numbers or symbols using, for example, a pseudo-random algorithm. During the programming process of the OTP memory 212, the RNG 214 may be used to generate a random data, for example, a random key to be stored in the OTP memory 212.

The public key accelerator (PKA) 216 may comprise suitable logic, circuitry, interfaces, and/or code that may be operable to perform functions, calculations, and/or operations relating to implementing security protocols such as Diffie-Hellman, RSA, and DSA.

The cryptographic accelerator 218 may comprise suitable logic, circuitry, interfaces, and/or code that may be operable to perform functions, calculations, and/or operations relating to implementing security protocols such as AES, DES, SHA, and HMAC.

The interrupt controller 220 may comprise suitable logic, circuitry, and/or code that may be operable to request attention from, for example, one of the masters 226a and 226b on behalf of one or more external devices and/or input/output devices.

The memory scrambling unit 222 may comprise suitable logic, circuitry, interfaces, and/or code that may be operable to scramble data that is transferred to and/or from the external memory 224. In this regard, the memory scrambling unit 222 may be programmed with a random number during boot-up, and after boot-up the random number may be inaccessible. During operation, the memory scrambling unit 222 may scramble data prior to writing the data to the memory 224. In this manner, the contents of the memory 224 may be scrambled without the random number to descramble it. The external memory 224 may comprise, for example, RAM, NVRAM, and/or flash residing off-chip.

The masters 226a and 226b may be substantially similar to the master 102 described with respect to FIG. 1. In an exemplary embodiment of the invention, the master 226a may comprise an ARM processor and the master 226b may comprise a DMA controller.

The bus matrix 230 may be substantially similar to the bus matrix 104 described with respect to FIG. 1. In various embodiments of the invention, the bus matrix 230 may be configured based on a mode of operation of the IC 200 and may be configured via one or more switches or registers, for example. In this regard, the bus matrix 230 may deny access to at least a portion of one or more of the secure BROM 202 comprising an API 204, the memory 208, the OTP memory 212, the random number generator 214, the PKA 216, the cryptographic accelerator 218, the interrupt controller 220, the memory scrambling unit 22, the mode timer 228, the secure watchdog module 230, and/or the mode controller 232 while operating in a secure mode. In various embodiments of the invention, the bus matrix 230 may comprise hardware such as one or more multiplexers, decoders, and/or registers.

The mode controller 232 may be substantially similar to the mode controller 114 described with respect to FIG. 1. In this regard, the mode controller 232 may control transitions between secure and open modes of operation.

The mode timer 228 may comprise suitable logic, circuitry, interfaces, and/or code that may be operable to implement a counter and to generate secure interrupts upon reaching a determined count. The mode timer 228 may count while the IC 200 is operating in an open mode and may be reset each time the IC 200 transitions to a secure mode of operation. In an exemplary embodiment of the invention, the mode timer 228 may generate a secure interrupt every $T_M$ seconds while the IC 200 is operating in an open mode, where Tm may be any integer or fractional part thereof. In various embodiments of the invention, the mode timer 228 may comprise hardware such as an up-counter and/or down-counter.

The secure watchdog module 230 may comprise suitable logic, circuitry, interfaces, and/or code that may be operable to implement a counter and to reset the IC 200 in instances that the secure watchdog 230 does not receive a secure refresh signal prior to reaching a determined count. In an exemplary embodiment of the invention, the secure refresh signal may be generated only while the IC 200 is in a secure mode of operation and thus the secure watchdog module 230 may trigger a reset of the IC 200 every $T_W$ seconds while the IC 200 is in an open mode. In various embodiments of the invention, the secure watchdog module 230 may comprise hardware such as an up-counter and/or down-counter.

In operation, the IC 200 may be powered on and go through a secure boot-up by executing instructions stored in the secure BROM 202. During boot-up, the contents of open BROM 206 may be verified before boot continues from the open BROM 206. During boot-up, various modules of the IC 200 may be designated as open or secure and the memory 208 may be partitioned into a secure portion and an open portion. In an exemplary embodiment of the invention, the IC 200 may be operable to implement various functions of a wireless handset.

After boot-up, the IC 200 may begin normal operation, during which the IC 200 may operate in an open mode for portions of time and in a secure mode for portions of time. While in a secure mode, the IC 200 may handle things such as authentication, encryption, decryption, and/or other functions and/or operations that involve private or secure information. While in an open mode, such private and/or secure information may be inaccessible. Access to the private and/or secure information may be enforced via hardware such that, for example, modification of an operating system, hypervisor, or other software running on the IC 200 will not compromise the private and/or secure information. In this regard, various registers and/or switching elements in one or more of the secure BROM 202, the open BROM 206, the memory 208, the MPU 210, the OTP memory 212, the RNG 214, the PKA 216, the cryptographic accelerator 218, the interrupt controller 220, the memory scrambling unit 22, the masters 226a and 226b, the mode timer 228, the secure watchdog module 230, and/or the mode controller 232.

In various embodiments of the invention, the mode timer 228 may trigger the IC 200 to transition to a secure mode of operation at least every $T_M$ seconds, and if the IC 200 does not enter the secure mode within $T_W$-$T_M$ seconds, then the IC 200 may be reset.

Figure 3:
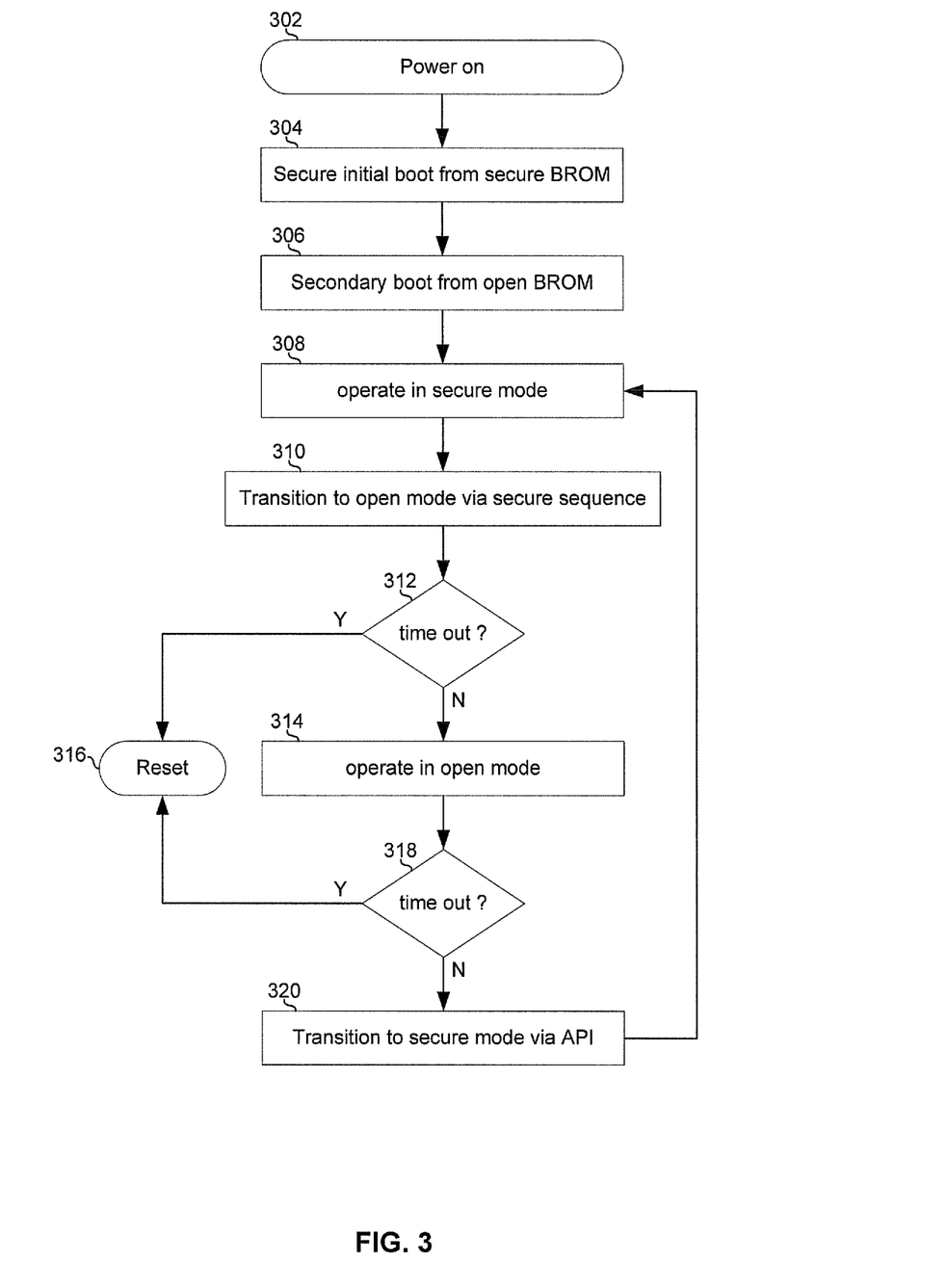
FIG. 3 is a flow chart illustrating exemplary operation of an integrated circuit operable to implement hardware enforced virtualization, in accordance with an embodiment of the invention.

FIG. 3 is a flow chart illustrating exemplary operation of an integrated circuit operable to implement hardware enforced virtualization, in accordance with an embodiment of the invention. Referring to FIG. 3, the exemplary steps may begin with step 302 when an IC such as the IC 100 or 200 is powered up. Subsequent to step 302, the exemplary steps may advance to step 304.

In step 304, the IC may perform a secure boot based on boot code stored in a secure BROM. During the secure boot, the state of various modules and/or resources in the IC may be configured into a known and/or predetermined secure state. As part of the secure boot, secondary boot instructions may be validated and/or authenticated. Other exemplary operations that may occur during secure boot comprise: designation of resources as open or secure, generation of one or more random numbers which may be stored in one or more secure resources such as the memory scrambling unit, read out of secure keys or passwords from OTP and utilizing the keys or passwords to authenticate the IC and/or ensure that the IC boots up in a known and/or predetermined state. Subsequent to step 304, the exemplary steps may advance to step 306. In step 306, the secondary boot instructions may be executed to complete boot-up of the IC. Subsequent to step 306, the exemplary steps may advance to step 308.

In step 308, the IC may operate in a secure mode. In this regard, during operation in the secure mode, the IC may perform authentication, encryption, decryption, and/or other secure transactions and/or functions. In various embodiments of the invention, the IC may reside in a wireless device. In such embodiments, the IC may be operable to, for example, authenticate the wireless device on a network and/or access secure and/or private data on the network. Subsequent to step 308, the exemplary steps may advance to step 310.

In step 310, the IC may trigger a transition to an open mode of operation. In this regard, in order to transition to an open mode of operation, a sequence of instructions may be executed to ensure that the IC is in a known and/or predetermined state prior to enabling access to secure information and/or states. For example, the sequence of instructions may ensure that buffers and/or caches are emptied and/or that pending reads and/or writes to/from memory have completed and/or are cancelled. Subsequent to step 310, the exemplary steps may advance to step 312.

In step 312, it may be determined whether the transition to the secure mode completed before a timeout. For example, in instances that the mode timer 228 triggers a transition to secure mode, but the transition does not complete before the secure watchdog 230 times out, then the exemplary steps may advance to step 316 and the IC may reset/reboot. In instances that the transition does complete before time out, the exemplary steps may advance to step 314.

In step 314, the IC may operate in an open mode. While operating in the open mode, resources in the IC designated as secure may be inaccessible. In this regard, the secure resources may be hidden and/or protected via hardware configuration. Subsequent to step 314, the exemplary steps may advance to step 318.

In step 312, it may be determined whether the IC has gone too long without operating in a secure mode. In this regard, in instances that the mode timer 228 triggers a transition to secure mode ever $T_M$ seconds, but the transition does not complete before the secure watchdog 230 times out, then the exemplary steps may return to step 316 and the IC may reset or reboot. In instances that the transition does complete before time out, the exemplary steps may advance to step 320.

In step 320, the IC may trigger a transition to the secure mode of operation. In this regard, in order to transition to the secure mode of operation, a sequence of instructions may be executed to ensure that the IC is in a known and/or predetermined state prior to the transition to the secure mode. For example, the sequence of instructions may ensure that buffers and/or caches are emptied and/or that pending reads and/or writes to/from memory have completed and/or are cancelled. Subsequent to step 320, the exemplary steps may return to step 308.

Figure 4:
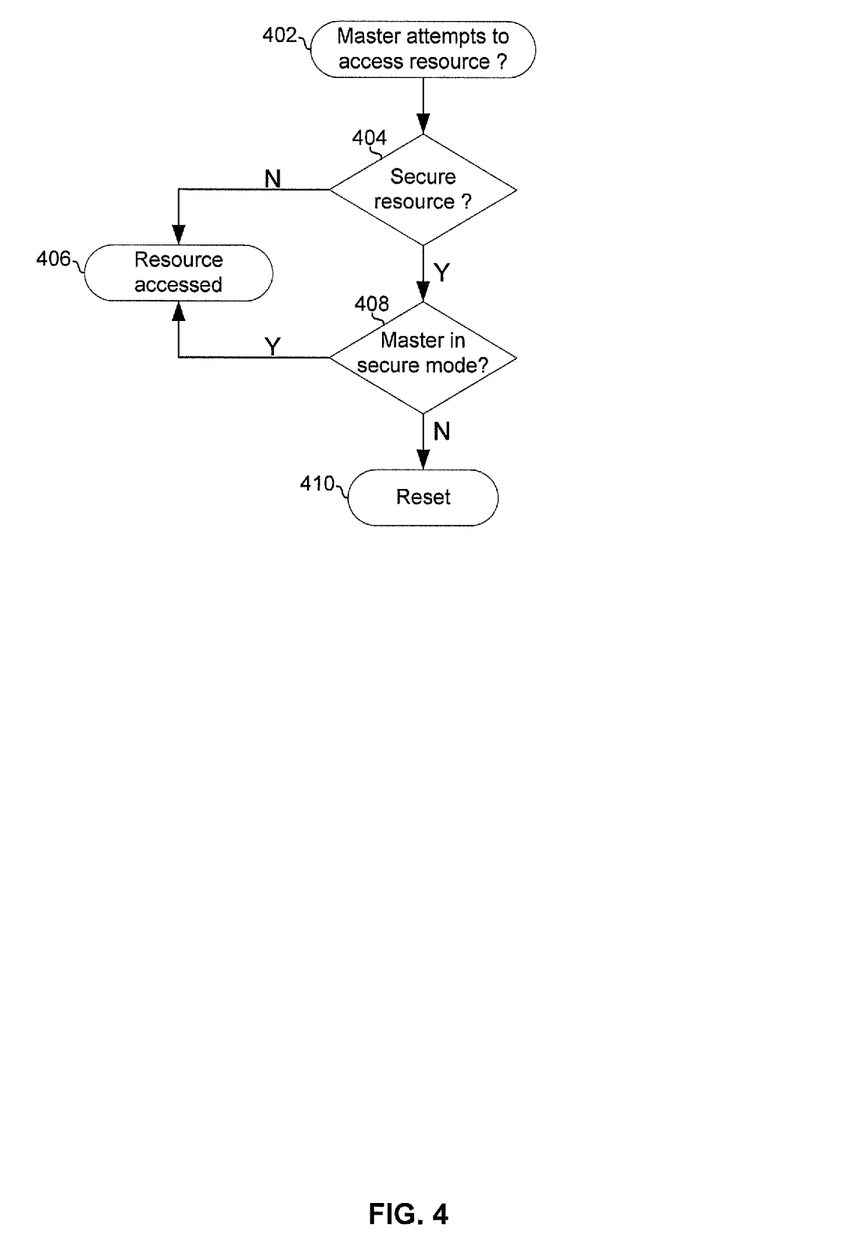
FIG. 4 is a flow chart illustrating resource access control in an IC enabled for hardware enforced virtualization, in accordance with an embodiment of the invention.

FIG. 4 is a flow chart illustrating resource access control in an IC enabled for hardware enforced virtualization, in accordance with an embodiment of the invention. Referring to FIG. 4, the exemplary steps may begin with step 402 when a master, such as the master 226a attempts to access a resource within the IC 200. For example, the attempted access may comprise an attempt write and/or read to and/or from memory. In step 404, in instances that the resource is an open resource, the steps may advance to step 406 and the resource may be accessed. In this regard, whether the access is secure may be indicated by a present configuration of one or more switching elements or registers.

Returning to step 404, in instances that the resource is a secure resource, the exemplary steps may advance to step 408. In step 408, in instances that the master attempting to access the secure resource is operating in a secure mode, then the exemplary steps may advance to step 406 and the resource may be accessed.

Returning to step 408, in instances that the master attempting to access the secure resource is operating in an open mode, this may indicate a security breach or attempted security breach. Accordingly, the exemplary steps may advance to step 410 and the IC may reset and/or reboot. In some embodiments of the invention, the IC may enter a locked state which may require, for example, an administrator or technician to restore the IC to an operational state.

Various aspects of a method and system for hardware enforced virtualization in an integrated circuit are provided. In an exemplary embodiment of the invention, a mode of operation of an integrated circuit 200 may be controlled such that the integrated circuit 200 alternates between a secure mode of operation and an open mode of operation. Various resources, such as the secure BROM 202, the OTP 212, the RNG 214, the PKA 216, the cryptographic accelerator 218, and the interrupt controller 220 of the integrated circuit 200 may be designated as open or secure, where secure resources may be made inaccessible while the integrated circuit operates in the open mode. Access to the secure resources may be controlled based on a configuration of one or more registers and/or switching elements, such as may be found in the bus matrix 230, for example. Resources designated as secure may comprise, for example, a one-time-programmable memory 212. A memory 208 may be partitioned and a portion may be designated as secure while another portion may be designated as open.

The integrated circuit 200 may comprise ROM 202 and/or one-time-programmable memory 212 that stores one or more instructions, such as the API 204, wherein execution of the one or more instructions may control transitions between the secure mode and the open mode. The instructions may ensure that one or more buffers are flushed or empty prior to transitioning between modes. The instructions may ensure that one or more caches are empty prior to transitioning between modes. The instructions may ensure that reads and/or writes to memory, such as the memory 208 and/or external memory 224 have completed or are cancelled prior to transitioning between modes. The integrated circuit 200 may comprise a hardware-defined state machine, within the mode controller 114, for example, that controls transitions between modes. The integrated circuit 200 may comprise one or more counters, such as the secure watchdog 230 and/or the mode timer 228, and transitions between modes may be triggered based on a state of the one or more counters. The integrated circuit 200 may reset in instances that it has not operated in the secure mode for longer than a determined period of time.

In an exemplary embodiment of the invention, one or more processors and/or circuits in the IC 100 may control a mode of operation of the IC 100 such that, at any given instant in time, the IC 100 operates in either a secure mode or an open mode. While operating in an open mode, secure resources 110 may be inaccessible. The secure resources 110 may be inaccessible via configuration of one or more switching elements and/or registers within he IC. The processors and/or circuits in the IC 100 may comprise, for example, the mode controller 114, the bus matrix 104, and/or the master 102. The processors and/or circuits may comprise one or more hardware defines state machines for controlling the mode of operation of the IC 100. For example, the mode controller 114 may comprise a hardware-defined state machine. The processors and/or circuits may comprise ROM 202 and/or OTP memory 212 for storing one or more instructions, the execution of which may control transitions between modes or operation. The instructions may be executed by, for example, the master 102 and execution of the instructions may ensure that one or more caches and/or buffers are emptied and/or flushed prior to transitioning between modes. The one or more processors and/or circuits may comprise one or more counters, such as in the watchdog 230 and/or the mode timer 228, and the state of the counters may be utilized to control the mode of operation.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for hardware enforced virtualization in an integrated circuit.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method performed by an integrated circuit, comprising:
   booting up securely, based on boot code stored in secure boot read-only memory, wherein the booting up securely comprises:
   configuring modules in the integrated circuit into known secure states, and authenticating secondary boot instructions stored in open boot read-only memory; subsequent to the integrated circuit booting up securely, executing the secondary boot instructions;
   due to the executing the secondary boot instructions, operating in a secure mode;
   while operating in the secure mode, transitioning to an open mode of operation after a period of time, based on instructions that ensure that the integrated circuit is in a known secure state prior to enabling access to secure information, wherein the instructions that ensure that the integrated circuit is in a known secure state ensure that buffers and caches are emptied and that pending reads and writes to and from memory have been completed or canceled;

subsequent to the transitioning to the open mode, determining whether the transitioning to the open mode was completed before a timeout;

rebooting the integrated circuit due to determining that a timeout occurred during the transition to the open mode, otherwise operating in the open mode;

while operating in the open mode, transitioning back to the secure mode of operation after a period of time; subsequent to the transitioning back to the secure mode, determining whether the transitioning back to the secure mode was completed before a timeout; and rebooting the integrated circuit due to determining that a timeout occurred during the transition back to the secure mode, otherwise operating in the secure mode.

2. The method of claim 1, wherein the booting up securely comprises: designating the modules as open or secure.

3. The method of claim 1, wherein the booting up securely comprises: reading one-time programmable keys and utilizing the keys to authenticate the integrated circuit and to ensure that the integrated circuit boots up in a known state.

4. The method of claim 1, wherein the operating in a secure mode comprises: performing authentication, encryption, and decryption.

5. The method of claim 4, wherein the authentication comprises authenticating a wireless device with respect to a network, to access private data on the network.

6. The method of claim 1, wherein during the operating in the open mode, modules in the integrated circuit designated as secure are inaccessible.

7. The method of claim 1, wherein during the operating in the open mode, determining whether the integrated circuit has operated beyond a predetermined period of time in the open mode, and when the integrated circuit has operated beyond the predetermined period of time in the open mode, rebooting the integrated circuit.

8. The method of claim 1, wherein the booting up is instructed from one-time programmable memory.

9. The method of claim 1, wherein the booting up is instructed from read-only memory.

10. A method, comprising:
executing boot code stored in secure boot read-only memory;
subsequent to the executing boot code stored in secure boot read-only memory, executing boot code stored in open boot read-only memory;
subsequent to the executing the boot code stored in the secure and the open boot read-only memory, operating an integrated circuit in a secure mode;
while operating the integrated circuit in the secure mode, executing code to transition the integrated circuit from the secure mode to an open mode of operation, wherein access to secure information occurs after buffers and caches have been emptied and pending reads and writes to and from memory have been completed or canceled;
subsequent to the transition to the open mode, determining whether the transition to the open mode was completed before a timeout;
rebooting the integrated circuit due to determining that a timeout occurred during the transition to the open mode;
while operating the integrated circuit in the open mode, executing code to transition the integrated circuit from the open mode to the secure mode;
subsequent to the transition to the secure mode from the open mode, determining whether the transition to the secure mode was completed before a timeout;
and resetting the integrated circuit due to determining that a timeout occurred during the transition to the secure mode.

11. The method of claim 10, wherein during operation in the open mode, executing code to transition the integrated circuit from the open mode to the secure mode of operation, wherein subsequent to the transition to the secure mode, determining whether the transition to the secure mode was completed before a timeout, and wherein rebooting the integrated circuit due to determining that a timeout occurred during the transition to the secure mode.

12. The method of claim 10, wherein the secure boot read-only memory is one-time programmable memory.

13. The method of claim 10, wherein the open boot read-only memory is one-time programmable memory.

14. A system, comprising:
a read-only memory device, the read-only memory device including secured boot code and open boot code embedded in the read-only memory device;
a processor, the processor configured to:
execute the secured boot code; and execute the open boot code subsequent to the execution of the secured boot code;
and an integrated circuit configured to:
operate in a secure mode subsequent to the execution of the open boot code;
transition to an open mode from the secure mode;
transition to the secure mode from the open mode;
while in the open mode, access secure information stored in memory after buffers and caches have been emptied in the memory and pending reads and writes to and from the memory have been completed or canceled; and reboot, where a time out occurs during the transition to the open mode; and reset, where a time out occurs during the transition to the secure mode.

15. The system according to claim 14, wherein the read-only memory includes instructions executable by the processor to control the transition to the secure mode and the transition to the open mode.

16. The system according to claim 15, wherein the instructions include a counter and the instructions are configured to trigger the transition to the secure mode and the transition to the open mode, according to a state of the counter.

17. The system according to claim 14, wherein the integrated circuit is configured to reset where the integrated circuit has not operated in the secure mode for longer than a determined period of time.

18. The system according to claim 14, wherein the read-only memory device is a one-time programmable memory device.

19. The system according to claim 14, wherein the secured boot code and the open boot coded are partitioned.

* * * * *